US010122962B2

(12) United States Patent
Hart et al.

(10) Patent No.: US 10,122,962 B2
(45) Date of Patent: Nov. 6, 2018

(54) SWITCHABLE HIGHPASS FILTER FOR CATV RETURN PATH

(71) Applicant: PPC BROADBAND, INC., East Syracuse, NY (US)

(72) Inventors: Thomas Hart, Fayetteville, NY (US); Calvin Howard, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 15/714,907

(22) Filed: Sep. 25, 2017

(65) Prior Publication Data

US 2018/0091771 A1   Mar. 29, 2018

Related U.S. Application Data

(60) Provisional application No. 62/399,705, filed on Sep. 26, 2016.

(51) Int. Cl.
*H04N 7/10* (2006.01)
*H04N 21/61* (2011.01)

(52) U.S. Cl.
CPC ............. *H04N 7/104* (2013.01); *H04N 7/102* (2013.01); *H04N 21/6118* (2013.01); *H04N 21/6168* (2013.01)

(58) Field of Classification Search
CPC .................................. H04N 21/6118
USPC .................................. 348/607–624
See application file for complete search history.

(56) References Cited

U.S. PATENT DOCUMENTS

| 5,730,612 | A | 3/1998 | Tatsuzuki | |
|---|---|---|---|---|
| 8,854,947 | B2 | 10/2014 | Jackson et al. | |
| 9,647,851 | B2 * | 5/2017 | Newby | H04L 12/2801 |
| 9,699,507 | B2 * | 7/2017 | Stafford | H04N 21/4436 |
| 9,729,257 | B2 * | 8/2017 | Williams | H04H 20/78 |
| 9,813,458 | B2 * | 11/2017 | Bailey | H04L 12/2801 |
| 9,948,687 | B2 * | 4/2018 | Bailey | H04L 12/2801 |
| 2010/0095344 | A1 * | 4/2010 | Newby | H04L 12/2801 |
| | | | | 725/125 |
| 2013/0291029 | A1 * | 10/2013 | Wells | H04N 21/6168 |
| | | | | 725/78 |

(Continued)

OTHER PUBLICATIONS

Shane Thomas (Authorized Officer), International Search Report and Written Opinion dated Nov. 30, 2017, PCT Application No. PCT/US2017/053301, filed Sep. 25, 2017, pp. 1-12.

*Primary Examiner* — Paulos M Natnael
(74) *Attorney, Agent, or Firm* — MH2 Technology Law Group LLP

(57) ABSTRACT

A device for filtering a cable television (CATV) signal includes an input port configured to receive downstream signals from a CATV headend and provide upstream signals thereto, an output port configured to be coupled to a subscriber device and provide the downstream signals thereto and to receive the upstream signals therefrom, and a filter circuit configured to transmit the upstream and the downstream signals between the input port and the output port for a predetermined duration after the output port is coupled to the subscriber device. The filter circuit is configured to block at least a portion of the upstream signals, at least a portion of the downstream signals, or both from being transmitted between the input port and the output port in response to an expiration of the predetermined duration.

30 Claims, 5 Drawing Sheets

(56) References Cited

U.S. PATENT DOCUMENTS

2018/0091771 A1* 3/2018 Hart ...................... H04N 7/104

* cited by examiner

SWITCHABLE HIGHPASS FILTER FOR CATV RETURN PATH

CROSS-REFERENCE TO RELATED APPLICATIONS

This application claims priority to U.S. Provisional Patent Application No. 62/399,705, filed on Sep. 26, 2016, the entirety of which is incorporated by reference herein.

BACKGROUND

Cable television (CATV) networks supply and distribute high frequency "downstream" signals from a main signal distribution facility, known as a "headend," to premises (e.g., homes and offices) of subscribers. The downstream signals can be provided to subscriber equipment, such as televisions, telephones, and computers. In addition, most CATV networks also receive and transmit "upstream" signals from subscriber equipment back to the headend of the CATV network. For example, set top boxes can send upstream signals including information for selecting programs for viewing on a television. Also, upstream and downstream signals are used by personal computers via modems connected through the CATV infrastructure to the Internet. Further, voice over Internet protocol (VOIP) telephones use upstream and downstream signals to communicate telephone conversations.

To permit simultaneous communication of upstream and downstream CATV signals, and to permit interoperability of the subscriber equipment and the equipment associated with the CATV network infrastructure outside of subscriber premises, the downstream and upstream signals are confined to two different frequency bands. For example, in some CATV networks, the downstream frequency band can be within the range of 54-1002 megahertz (MHz), and the upstream frequency band can be within the range of 5-42 MHz.

The upstream frequency band may be susceptible to ingress noise from a variety of sources, both within and exterior to the subscriber's premises. The noise may have little effect on an individual subscriber's experience using the network, but can burden the network on the plant-level. When the source of the noise is exterior to the premises, the source can be addressed by routine maintenance. However, when the source of the noise is within a subscriber's premises, which is common, the subscriber's consent is needed for the appropriate remedial measures to be taken. This can be a challenge, because the subscriber may not recognize that the noise is burdening the plant, and thus may have little or no incentive to provide access to the provider.

SUMMARY

Embodiments of the disclosure may provide a device for filtering a cable television (CATV) signal. The device includes a housing, and an insulator positioned at least partially within the housing, the insulator being configured to receive a cable and to move from a first position to a second position. Connecting the insulator to the cable causes the insulator to move from the first position to the second position. The device also includes an input port configured to receive downstream signals from a CATV headend and provide upstream signals thereto, an output port configured to be coupled to a subscriber device and provide the downstream signals thereto and to receive the upstream signals therefrom, and a circuit positioned at least partially within the housing. The circuit includes a first filter configured to block the upstream signals, the downstream signals, or both that are outside a first frequency band, a second filter configured to block the upstream signals, the downstream signals, or both that are outside a second frequency band that is different from the first frequency band, a trigger configured to actuate in response to the insulator moving from the first position to the second position, at least one switch configured to route the upstream signals, the downstream signals, or both to the first filter when the at least one switch is in a powered state and to route the upstream signals, the downstream signals, or both to the second filter when the at least one switch is in an unpowered state, and a power circuit configured to connect to the at least one switch in response to the trigger actuating. The power circuit is configured to supply power to actuate the at least one switch into the powered state for a predetermined duration when connected to the at least one switch, and the at least one switch is configured to actuate into the unpowered state after the predetermined duration.

Embodiments of the disclosure may also provide a device for filtering a cable television (CATV) signal. The device includes an input port configured to receive downstream signals from a CATV headend and provide upstream signals thereto, an output port configured to be coupled to a subscriber device and provide the downstream signals thereto and to receive the upstream signals therefrom, and a filter circuit configured to transmit the upstream and the downstream signals between the input port and the output port for a predetermined duration after the output port is coupled to the subscriber device. The filter circuit is configured to block at least a portion of the upstream signals, at least a portion of the downstream signals, or both from being transmitted between the input port and the output port in response to an expiration of the predetermined duration.

Embodiments of the disclosure may also provide a device for filtering a cable television (CATV) signal. The device includes an input port configured to receive downstream signals from a CATV headend and to provide upstream signals thereto, an output port configured to be coupled to a subscriber device and provide the downstream signals thereto and to receive the upstream signals therefrom, a trigger configured to actuate in response to the output port being coupled to the subscriber device, and a filter circuit configured to permit the upstream and downstream signals to be communicated between the input port and the output port for a predetermined duration in response to the trigger being actuated. The filter circuit is configured to block at least a portion of the upstream signals, at least a portion of the downstream signals, or both from being communicated between the input port and the output port after the predetermined duration.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

DETAILED DESCRIPTION

Embodiments of the present disclosure may provide a device that is configured to disrupt delivery of signals to or from a subscriber premises in response to a predetermined time elapsing after a trigger is actuated. In one example, the device includes a filter circuit including first and second filters. The filter circuit is configured to switch from one filter to the other after the predetermined amount of time. The first filter may be configured to allow transmission of signals in a particular frequency range (e.g., a high-pass filter that allows transmission of a certain frequency that is within the normal upstream data transmission frequency band). The second filter may be configured to block transmission of at least some of the signals allowed to pass by the first filter. Further, the filter circuit may employ a trigger (e.g., a mechanical trigger, an electrical trigger, a hydraulic trigger, etc.) to detect when the device is initially installed, and may employ a delay circuit or timer connected to one or more radiofrequency (RF) switches to control when the filter circuit switches from the first high-pass filter second high-pass filter.

The device may be installed externally to the subscriber's premises in response to detection of ingress noise. Once the device is installed, the first filter may be active. The subscriber may be notified at this time and a service call requested. After the predetermined amount of time, if a service call is not initiated, the second filter is activated and may disrupt signal communication to or from the subscriber's premises, resulting in the subscriber initiating a service call to the provider.

Figure 1:
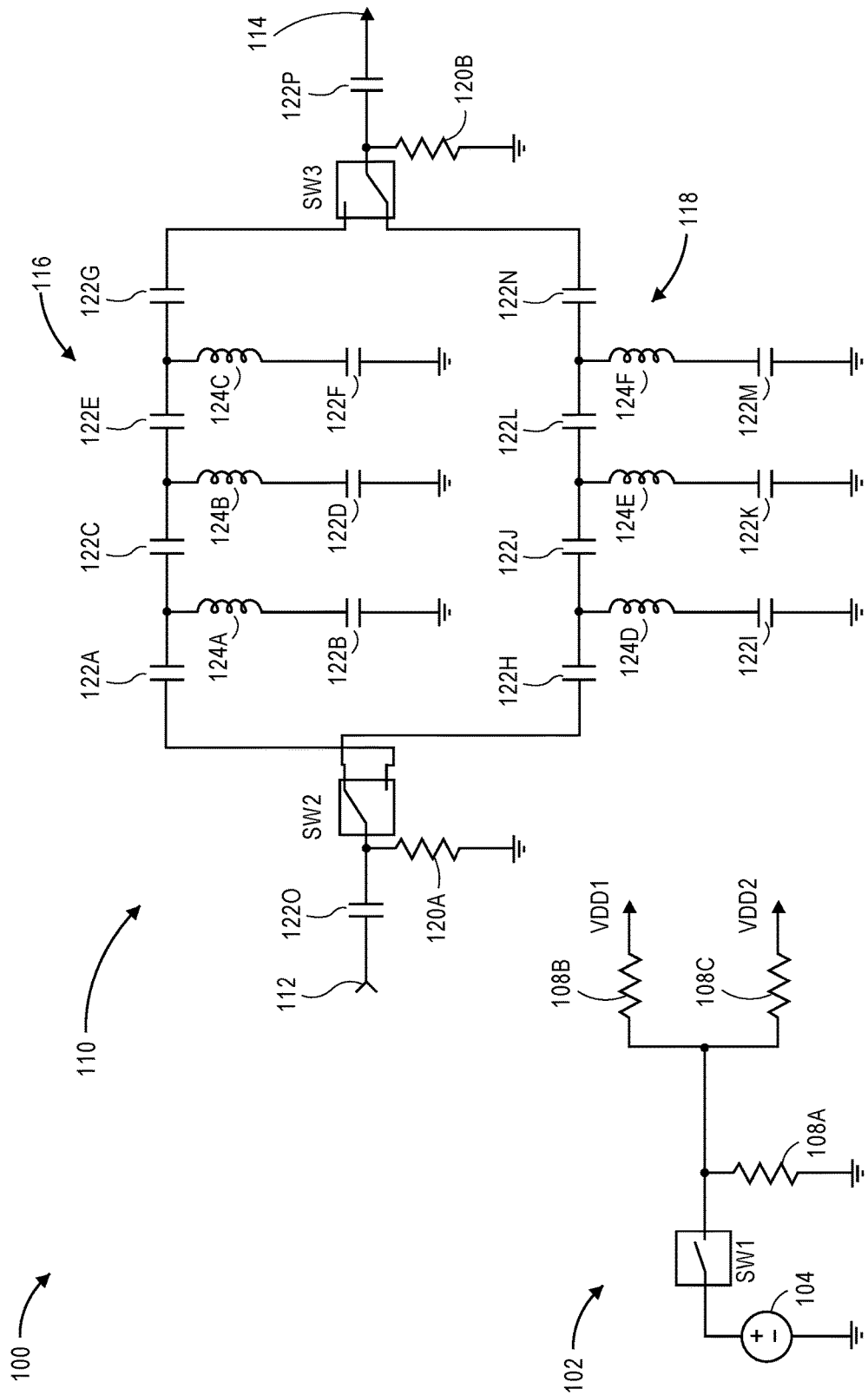
FIG. 1 illustrates a schematic view of a circuit for filtering signals, according to an embodiment.

Turning now to the specifically-illustrated example embodiments, FIG. 1 depicts a circuit diagram of a circuit 100, according to an embodiment. The circuit 100 may include a delay circuit 102. In some embodiments, the delay circuit 102 may also supply power to the circuit 100, and thus may be referred to herein as a power circuit FIG. 1 illustrates an example of such an embodiment, and thus the delay circuit 102 includes a battery 104 and a switch SW1. Further, the delay circuit 102 may include a first resistor 108A connected to ground, with the switch SW1 being between the battery 104 and the first resistor 108A. The switch SW1 may be controlled by a trigger, as will be described in greater detail below. The resistance of the first resistor 108A and the current stored in the battery 104 may be selected such that the battery 104 is configured to discharge for a generally predetermined duration until the battery is drained. The predetermined duration may be any suitable duration, e.g., between about 5 days and about 30 days. In one specific example, the duration may be about 15 days. It will be appreciated, however, that the duration may be any longer or shorter period of time, as desired. The delay circuit 102 may also include a second resistor 108B and a third resistor 108C.

The circuit 100 may also include a filter circuit 110 that defines a signal path. The filter circuit 110 may be positioned between a first port 112 and a second port 114 and may provide two parallel paths for signal transmission therebetween. The filter circuit 110 may be bidirectional, allowing transmission of at least some upstream and downstream signals. The paths may include a first filter 116 and a second filter 118, respectively, with each of the filters 116, 118 including electrical components (e.g., resistors, capacitors, inductors, etc.) as needed to provide the functionality of the filters 116, 118.

In at least some embodiments, the first and second filters 116, 118 may be high-pass filters. In particular, the first high-pass filter 116 may be configured to allow signals above a first frequency to pass and block signals below the first frequency. The second high-pass filter 118 may be configured to allow signals above a second frequency to pass and block signals below the second frequency. In an embodiment, the first frequency may be lower than the second frequency. For example, the first frequency may be in the range of the upstream data transmission frequency band. In some cases, the upstream data transmission frequency band may be between 5 MHz and 42 MHz, and thus the first frequency may be a frequency therebetween, such that at least some upstream data signals are able to pass through the first high-pass filter 116, when the first high-pass filter 116 is active. In an embodiment, the first frequency may be a frequency in the range of from about 5 MHz to about 40 MHz, from about 10 MHz to about 35 MHz, or from about 15 MHz to about 30 MHz. For example, the first frequency may be about 35 MHz.

In an embodiment, the second frequency may be above the frequency band of upstream data transmission signals, such that, when active, the second high-pass filter 118 blocks upstream data signals. In an embodiment, the second frequency may be from about 42 MHz to about 60 MHz, for example, about 45 MHz or 50 MHz.

The filter circuit 110 may also include one or more resistors (two shown: 120A, 120B), one or more capacitors (sixteen shown: 122A-122P), and one or more inductors (six shown: 124A-124F). As shown, the capacitors 122A-122G and the inductors 124A-124C may be part of the first high-pass filter 116, and the capacitors 122H-122N and the inductors 124D-124F may be part of the second high-pass filter 118.

The circuit 100 may also include at least one switch (two shown: SW2 and SW3, which may also be referred to as "second" and "third" switches SW2, SW3) that may control whether a signal from the input port 112 flows through the first or second high-pass filter 116, 118. The second and third switches SW2, SW3 may be radiofrequency (RF) switches, e.g., electromechanical or semiconductor switches. The second switch SW2 may be connected to a first, input side of the circuit 100, and the third switch SW3 may be connected to a second, output side of the circuit 100. The second and third switches SW2, SW3 may have a default, unpowered state and a powered state. In the default state (as illustrated), the second and third switches SW2, SW3 may route signals through the second high-pass filter 118. In the powered state, the second and third switches SW2, SW3 may route signals though the first high-pass filter 116.

The battery 104 may be selectively connected to the switches SW2 and SW3 via the switch SW1, so as selectively provide power thereto. Specifically, when the first switch SW1 is open, the battery 104 may be isolated from the switches SW2, SW3, and when the first switch SW1 is closed, the battery 104 may be electrically connected to the second and third switches SW2, SW3 as indicated at VDD1 and VDD2, respectively.

Figure 2A:
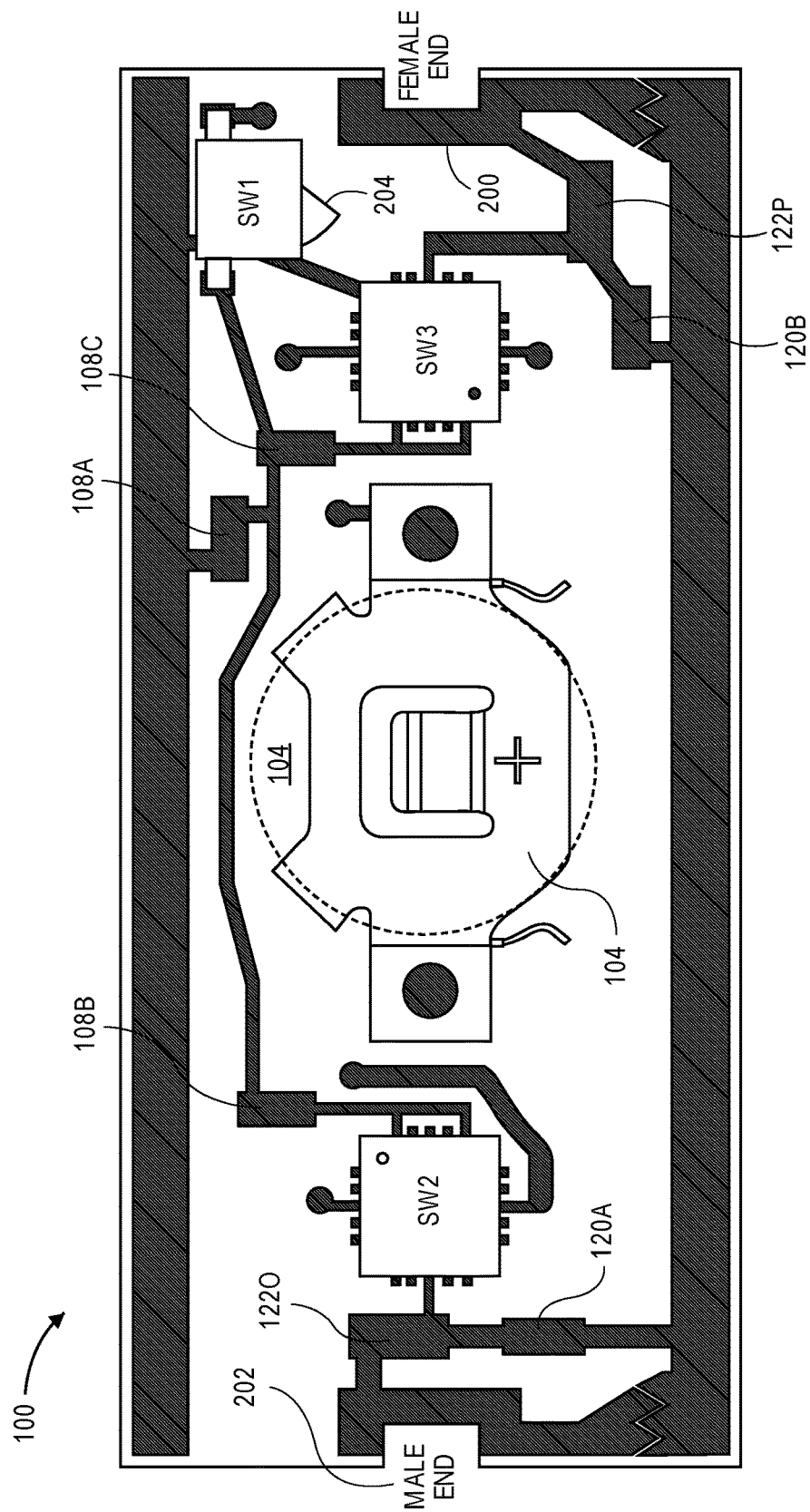
FIGS. 2A and 2B illustrate schematic views of the circuit, according to an embodiment.
Figure 2B:
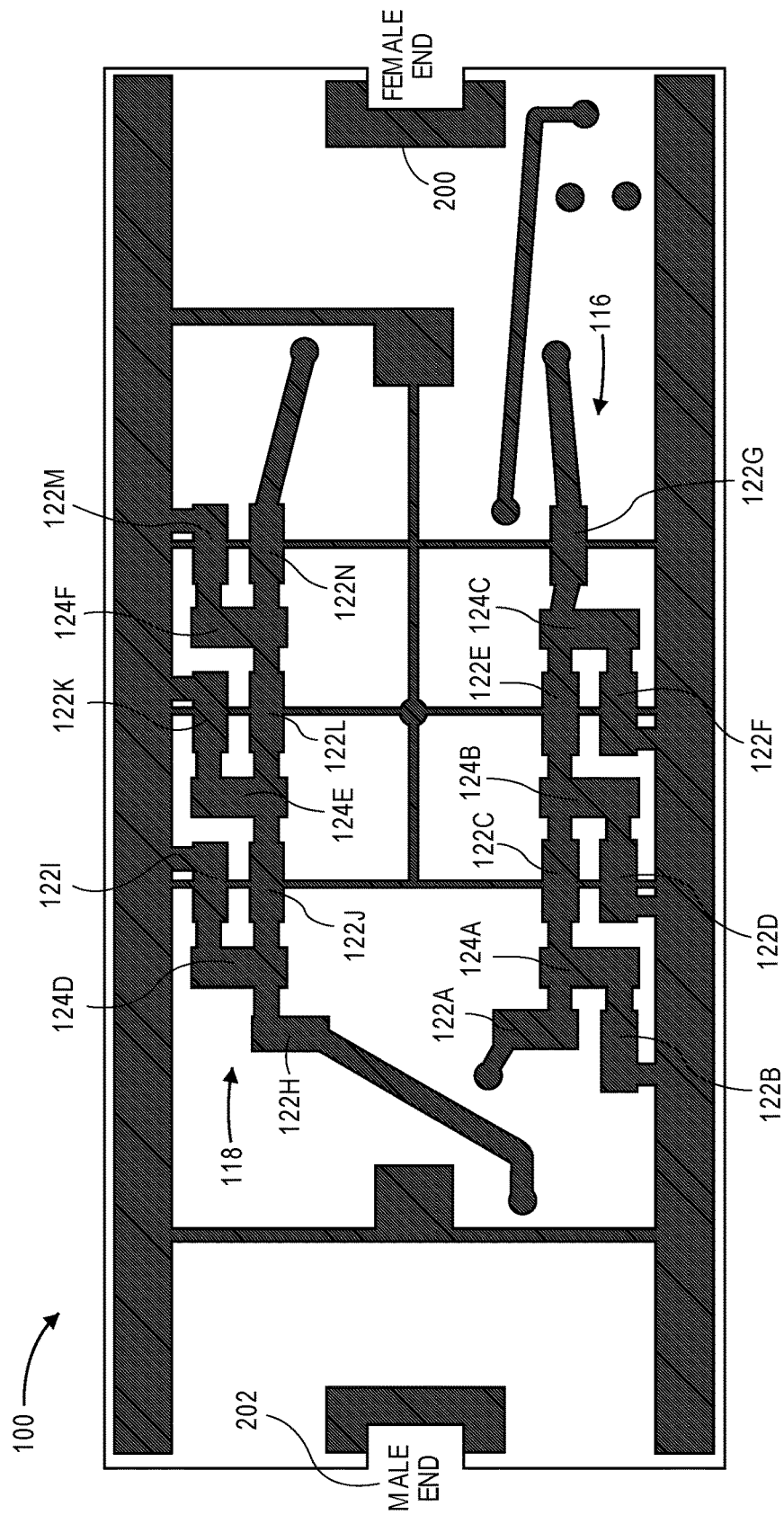

FIGS. 2A and 2B illustrate schematic views of a circuit board for the circuit 100, according to an embodiment. The circuit 100 may extend between female and male ends 200, 202, as shown. In an embodiment, the female end 200 may correspond to the first port 112 of FIG. 1, and the male end 202 may correspond to the second port 114 of FIG. 1; however, this is merely an example and could be reversed in some embodiments. As noted above, the circuit 100 may include the switches SW1, SW2, and SW3.

The switch SW1 may be positioned proximal to the female end 200 and may include a trigger 204. The trigger 204 may include a mechanical lever or any other suitable device that is actuated upon installation of a device that includes the circuit 100, e.g., at a subscriber's premises. When actuated, the trigger 204 throws the switch SW1 from an open state to a closed state. In an embodiment, the trigger 204 may be coupled to an insulator, which may move when the filter is initially employed, as will be described below.

Figure 3:
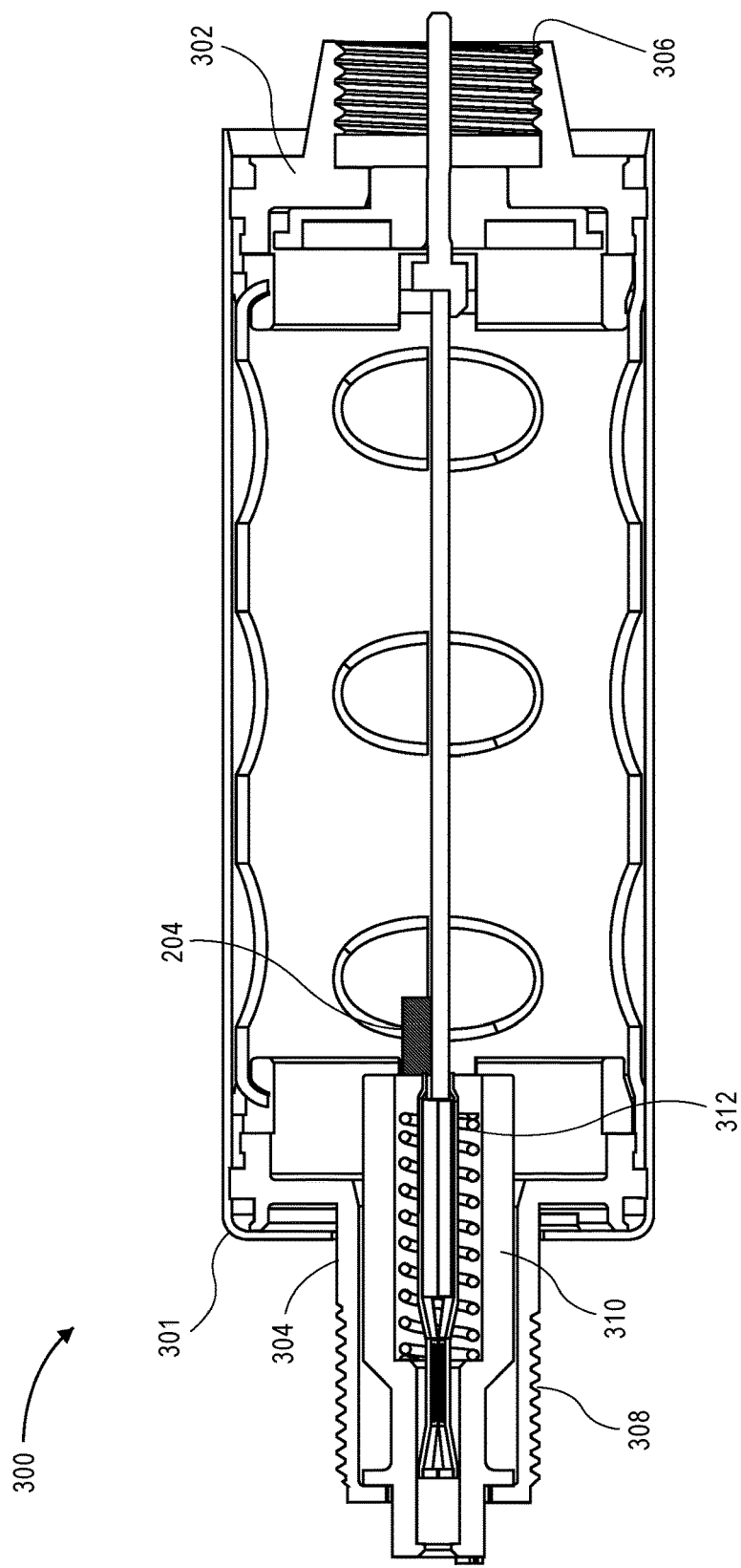
FIG. 3 illustrates a side, cross-sectional view of a device including the circuit, according to an embodiment.

FIG. 3 illustrates a side, cross-sectional view of a device for filtering signals 300, according to an embodiment. FIG. 3, in particular, illustrates an example of a mechanism for actuating the trigger 204. As shown, the device 300 includes a housing 301 in which first and second headers 302, 304 are located. The circuit 100 (e.g., FIG. 1) may be positioned between the headers 302, 304. The headers 302, 304 may include connectors: one male connector (or pin) 306 and one female connector (or contact) 308, respectively. The female connector 308 may be configured to connect to an F connector. An insulator 310 may extend therebetween, and may be at least partially contained within the female connector 308. A portion of the insulator 310 may extend outward, through the end of the female connector 308, such that, for example, when an F-connector of a cable is attached thereto, the insulator 310 is pressed into the housing 301.

Further, the device 300 may include a biasing mechanism (e.g., a spring) 312, which may be positioned within the female connector 308 and, e.g., within the insulator 310. The spring 312 may bias the insulator 310 toward the left (as shown), such that the aforementioned portion thereof extends out of the female connector 308. Further, the spring 312 may be compressed when the insulator 310 is pressed into the housing 301.

The insulator 310 may be connected to the trigger 204 (shown schematically in FIG. 3), such that the trigger 204 is actuated when the insulator 310 is pressed toward the male connector 306. Because the insulator 310 is extending through (protrudes outward from) the female connector 308, the insulator 310 may be pressed toward the male connector 306 when the device 300 is initially connected to the switch (and/or a cable), thereby actuating the trigger 204.

Accordingly, referring again additionally to FIG. 1, the switch SW1 may be thrown to the closed position upon initial installation of the device 300. Referring additionally to FIG. 2, throwing the switch SW1 to the closed position may cause the battery 104 to energize the switches SW2, SW3. In turn, this causes the switches SW2, SW3 to take their powered positions, thereby routing (e.g., upstream and/or downstream) signals to the first high-pass filter 116. In the meantime, the battery 104 discharges to ground via the first resistor 108A, until the predetermined amount of time (predetermined duration) expires. At this point, the battery 104 no longer energizes the switches SW2, SW3, and the switches SW2, SW3 may return to the default state. Thereafter, the switches SW2, SW3 may route (e.g., upstream and/or downstream) data signals to the second high-pass filter 118. Since the second frequency of the second high-pass filter 118 is above the upstream signal frequency band, the circuit 100 may disrupt upstream data transmission after the battery 104 discharges. This consequence may be easily noticed by the subscriber, resulting in a service call to the provider and access to the premises to correct the source of any noise.

Figure 4:
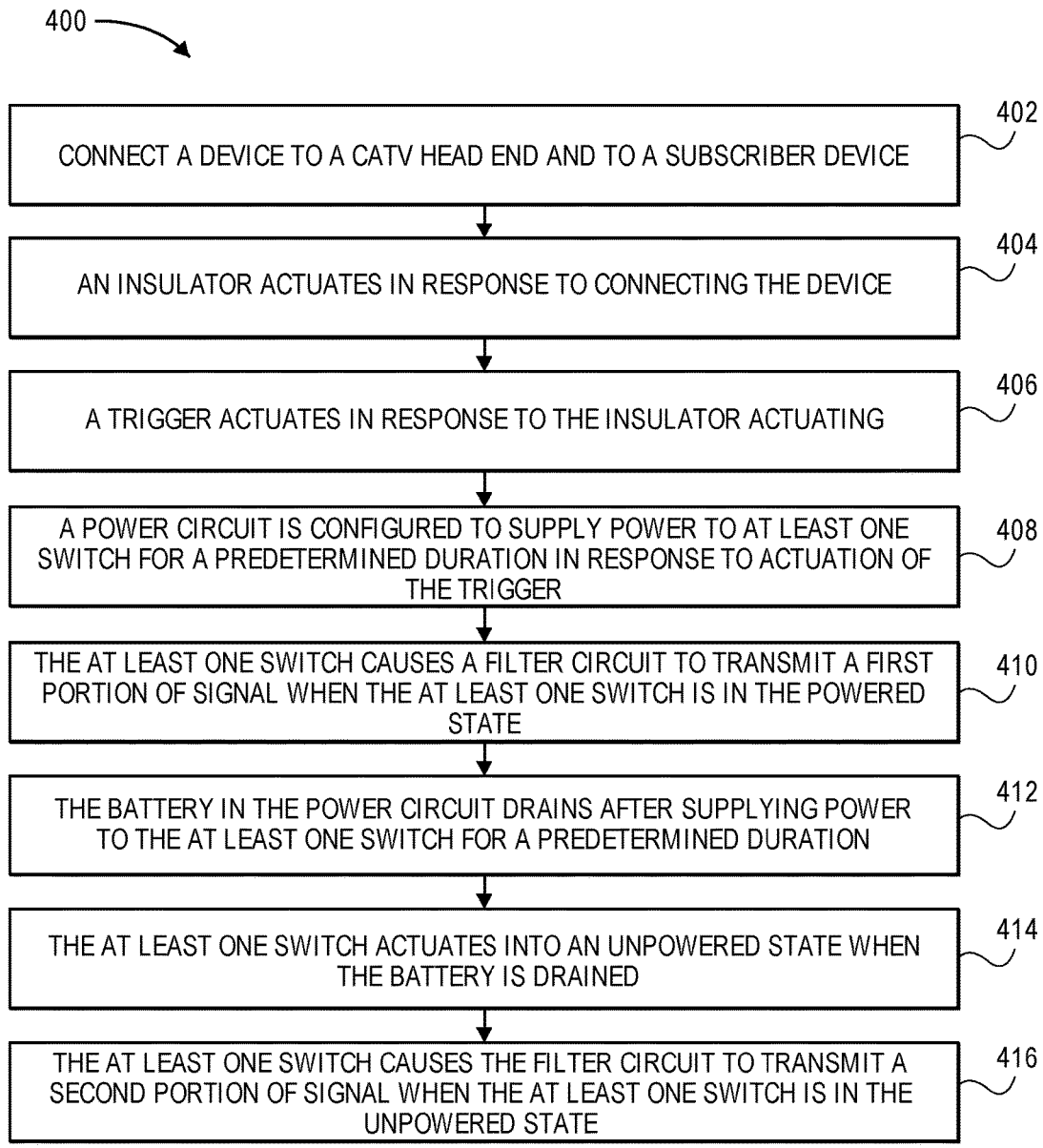
FIG. 4 illustrates a flowchart of a process for filtering a signal, according to an embodiment.

FIG. 4 illustrates a flowchart of a process 400 for filtering signals, e.g., executed by operation of the device 300, according to an embodiment. The user may connect the device 300 to the CATV network (e.g., the head end via one or more cables) and to the subscriber device, as at 402. More particularly, the input port 112 is configured to be connected to the CATV head end and receive downstream signals therefrom, and the output port 114 is configured to be connected to the subscriber device and receive upstream signals therefrom. Further, the input port 112 is configured to provide the upstream signals received through the output port 114 to the CATV head end.

The insulator 310 is configured to actuate from the first position into the second position in response to the device 300 (e.g., the output port 114) being connected to the subscriber device, as at 404. More particularly, in a specific embodiment, the force applied to the insulator 310 during installation may overcome the opposing force exerted on the insulator 310 by the biasing mechanism 312, causing the insulator 310 to actuate into the second position.

The trigger 204 is configured to actuate in response to the output port 114 being coupled to the subscriber device. More particularly, the trigger 204 is configured to actuate in response to the insulator 310 actuating into the second position, as at 406.

Actuating the trigger 204 initiates the delay (e.g., power) circuit 102. For example, the delay circuit 102 is configured to supply power to the at least one switch SW2, SW3 for the predetermined duration in response to actuation of the trigger 204, as at 408. More particularly, the first switch SW1 in the delay circuit 102 is configured to actuate from an open state to a closed state in response to actuation of the trigger 204, thereby connecting the battery 104 to the at least one switch SW2, SW3 such that the battery 104 supplies power to the at least one switch SW2, SW3. This actuates the at least one switch SW2, SW3 into the powered state.

The at least one switch SW2, SW3 is configured to cause the filter circuit 110 to transmit a first portion of upstream and/or downstream signals between the input port 112 and the output port 114 for the predetermined duration when in the powered state, as at 410. More particularly, the at least one switch SW2, SW3 is configured to route the upstream and/or downstream signals to the first high-pass filter 116 when the at least one switch SW2, SW3 is in the powered state. The first high-pass filter 116 may allow the first portion of the upstream and/or downstream signals (e.g., in a first frequency band) to pass therethrough and block the signals outside the first frequency band. The switches SW2, SW3 may actuate simultaneously.

The battery 104 drains while supplying power to the at least one switch SW2, SW3 for the predetermined duration, as at 412. As a result, the battery 104 fails to supply a threshold current to the at least one switch SW2, SW3 after the predetermined duration. The at least one switch SW2, SW3 is configured to actuate into the unpowered state when the battery 104 fails to supply the threshold current, as at 414.

The at least one switch SW2, SW3 is configured to cause the filter circuit 110 to transmit a second portion of the upstream and/or downstream signals between the input port 112 and the output port 114 when in the unpowered state (e.g., after the predetermined duration), as at 416. More particularly, the at least one switch SW2, SW3 is configured to route the upstream and/or downstream signals to the second high-pass filter 118 in response to the at least one switch SW2, SW3 actuating into the unpowered state. The second high-pass filter 118 may allow a second portion of the upstream and/or downstream signals (e.g., in a second frequency band) to pass therethrough and block signals outside the second frequency band.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. The present disclosure is not to be limited in terms of the particular embodiments described in this application, which are intended as illustrations of various aspects. Many modifications and variations can be made without departing from its spirit and scope, as will be apparent to those skilled in the art. Functionally equivalent apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What is claimed is:

1. A device for filtering a cable television (CATV) signal, the device comprising:

a housing;

an insulator positioned at least partially within the housing, the insulator being configured to receive a cable and to move from a first position to a second position, wherein connecting the insulator to the cable causes the insulator to move from the first position to the second position;

an input port configured to receive downstream signals from a CATV headend and provide upstream signals thereto;

an output port configured to be coupled to a subscriber device and provide the downstream signals thereto and to receive the upstream signals therefrom; and a circuit positioned at least partially within the housing, wherein the circuit comprises:

a first filter configured to block the upstream signals, the downstream signals, or both that are outside a first frequency band;

a second filter configured to block the upstream signals, the downstream signals, or both that are outside a second frequency band that is different from the first frequency band;

a trigger configured to actuate in response to the insulator moving from the first position to the second position;

at least one switch configured to route the upstream signals, the downstream signals, or both to the first filter when the at least one switch is in a powered state and to route the upstream signals, the downstream signals, or both to the second filter when the at least one switch is in an unpowered state; and a power circuit configured to connect to the at least one switch in response to the trigger actuating, wherein the power circuit is configured to supply power to actuate the at least one switch into the powered state for a predetermined duration when connected to the at least one switch, and wherein the at least one switch is configured to actuate into the unpowered state after the predetermined duration.

2. The device of claim 1, wherein the power circuit comprises a first switch configured to actuate from an open state to a closed state in response to the trigger actuating, wherein a battery in the power circuit is disconnected from the at least one switch when the first switch is in the open state such that the at least one switch is in the unpowered state, and wherein the battery is connected to the at least one switch when the first switch is in the closed state such that the at least one switch is in the powered state for the predetermined duration.

3. The device of claim 2, wherein the at least one switch comprises a second switch and a third switch, the second switch being connected to a first side of the first filter and a first side of the second filter, and the third switch being connected to a second side of the first filter and a second side of the second filter, wherein the second and third switches are configured to actuate simultaneously between the powered state and the unpowered state.

4. The device of claim 3, wherein the housing comprises a female connector and a male connector, and wherein a portion of the insulator extends outward through an end of the female connector when the insulator is in the first position, and wherein the insulator is configured to overcome an opposing force exerted by a biasing mechanism and move toward the male connector when the insulator moves into the second position.

5. A device for filtering a cable television (CATV) signal, the device comprising:
an input port configured to receive downstream signals from a CATV headend and provide upstream signals thereto;
an output port configured to be coupled to a subscriber device and provide the downstream signals thereto and to receive the upstream signals therefrom;
a filter circuit configured to transmit the upstream and the downstream signals between the input port and the output port for a predetermined duration after the output port is coupled to the subscriber device; wherein the filter circuit is configured to block at least a portion of the upstream signals, at least a portion of the downstream signals, or both from being transmitted between the input port and the output port in response to an expiration of the predetermined duration; and
at least one switch configured to actuate into a powered state when the output port is coupled to the subscriber device and to actuate into an unpowered state after the expiration of the predetermined duration, wherein the filter circuit is configured to transmit the upstream and downstream signals when the at least one switch is in the powered state, and wherein the filter circuit is configured to block the at least a portion of the upstream signals, the at least a portion of the downstream signals, or both in response to the at least one switch actuating into the unpowered state.

6. The device of claim 5, wherein the at least one switch comprises a first switch coupled to a first side of the filter circuit and a second switch coupled to a second side of the filter circuit, wherein the first and second switches are configured to actuate simultaneously between the powered state and the unpowered state.

7. The device of claim 5, further comprising a trigger that is configured to actuate in response to the output port being coupled to the subscriber device, wherein the at least one switch is configured to actuate into the powered state for the predetermined duration in response to actuation of the trigger.

8. The device of claim 7, further comprising a power circuit comprising a battery, wherein the power circuit is configured to supply power from the battery to the at least one switch for the predetermined duration in response to actuation of the trigger, causing the at least one switch to actuate into the powered state for the predetermined duration.

9. The device of claim 8, wherein the battery fails to supply a threshold current to the at least one switch after the predetermined duration; causing the at least one switch to actuate into the unpowered state.

10. The device of claim 8, wherein the power circuit comprises a first switch configured to actuate from an open state to a closed state in response to actuation of the trigger, causing the battery to supply power to the at least one switch.

11. A device for filtering a cable television (CATV) signal, the device comprising:
an input port configured to receive downstream signals from a CATV headend and to provide upstream signals thereto;
an output port configured to be coupled to a subscriber device and provide the downstream signals thereto and to receive the upstream signals therefrom;
an insulator configured to move from a first position to a second position in response to the output port being coupled to the subscriber device;
a biasing mechanism configured to bias the insulator into the first position before the output port is coupled to the subscriber device, and wherein the insulator is configured overcome an opposing force exerted by the biasing mechanism and to move into the second position when the output port is coupled to the subscriber device;
a trigger configured to actuate in response to the insulator moving from the first position to the second position; and
a filter circuit configured to permit the upstream and downstream signals to be communicated between the input port and the output port for a predetermined duration, wherein the predetermined duration starts in response to the trigger being actuated, wherein the filter circuit is configured to block at least a portion of the upstream signals, at least a portion of the downstream signals, or both from being communicated between the input port and the output port after the predetermined duration.

12. The device of claim 11, wherein the filter circuit comprises:
a first filter configured to block the upstream signals, the downstream signals, or both that are outside a first frequency band; and
a second filter configured to block the upstream signals, the downstream signals, or both that are outside a second frequency band that is different from the first frequency band.

13. The device of claim 12, wherein the first filter comprises a first high-pass filter configured to block the upstream signals, the downstream signals, or both below a first frequency that is from about 5 MHz to about 40 MHz, and wherein the second filter comprises a second high-pass filter configured to block the upstream signals, the downstream signals, or both below a second frequency that is from about 42 MHz to about 60 MHz.

14. The device of claim 11, further comprising a housing comprising a female connector and a male connector, and wherein a portion of the insulator extends outward through an end of the female connector when the insulator is in the first position, and wherein the insulator is configured to move toward the male connector when the insulator moves into the second position.

15. A device for filtering a cable television (CATV) signal, the device comprising:
   an input port configured to receive downstream signals from a CATV headend and to provide upstream signals thereto;
   an output port configured to be coupled to a subscriber device and provide the downstream signals thereto and to receive the upstream signals therefrom;
   a trigger configured to actuate in response to the output port being coupled to the subscriber device;
   a filter circuit configured to permit the upstream and downstream signals to be communicated between the input port and the output port for a predetermined duration in response to the trigger being actuated, wherein the filter circuit is configured to block at least a portion of the upstream signals, at least a portion of the downstream signals, or both from being communicated between the input port and the output port after the predetermined duration, wherein the filter circuit comprises:
      a first filter configured to block the upstream signals, the downstream signals, or both that are outside a first frequency band; and
      a second filter configured to block the upstream signals, the downstream signals, or both that are outside a second frequency band that is different from the first frequency band; and
   at least one switch configured to actuate into a powered state when the output port is coupled to the subscriber device and to actuate into an unpowered state after the expiration of the predetermined duration, wherein the filter circuit is configured to route the upstream signals, the downstream signals, or bath to the first filter when the at least one switch is in the powered state, and wherein the filter circuit is configured to route the upstream signals, the downstream signals, or both to the second filter in response to the at least one switch actuating into the unpowered state.

16. The device of claim 15, further comprising a power circuit comprising a battery that is configured to supply power to the at least one switch for the predetermined duration in response to actuation of the trigger, causing the at least one switch to actuate into the powered state for the predetermined duration.

17. The device of claim 16, wherein the power circuit further comprises a first switch configured to actuate from an open state to a closed state in response to actuation of the trigger, wherein the battery is disconnected from the at least one switch when the first switch is in the open state such that the at least one switch is in the unpowered state, and wherein the battery is connected to the at least one switch when the first switch is in the closed state such that the at least one switch is in the powered state for the predetermined duration.

18. A device for filtering a cable television (CATV) signal, the device comprising:
   a filter circuit configured to relay two-way CATV signals between a CATV network and a subscriber network during a predetermined duration, and block a portion of the two-way CATV signals from being relayed between the CATV network and the subscriber network after the predetermined duration;
   wherein the filter circuit is configured to actuate into a first state in response to the device being coupled to a subscriber device, and actuate into a second state after the predetermined duration;
   wherein the filter circuit is configured to relay the two-way CATV signals between the CATV network and the subscriber network when the filter circuit is in the first state, the two-way CATV signals that are configured to be relayed when the filter circuit is in the first state being in a first frequency band; and
   wherein the filter circuit is configured to block the portion of the two-way CATV signals from being relayed between the CATV network and the subscriber network when the filter circuit is in the second state, the two-way CATV signals that are configured to be relayed when the filter circuit is in the second state being in a second frequency band that is different from the first frequency band.

19. The device of claim 18, wherein the filter circuit includes a switch that is configured to actuate into the first state when the device is coupled to the subscriber device, and actuate into the second state after the predetermined duration.

20. The device of claim 18, wherein the first state comprises a powered state and the second state comprises an unpowered state.

21. The device of claim 18, wherein the filter circuit is configured to relay the two-way CATV signals between an input port that is configured to be in communication with the CATV network and an output port that is configured to be in communication with the subscriber network.

22. The device of claim 21, wherein the output port is configured to be coupled to the subscriber device.

23. The device of claim 21, wherein the two-way CATV signals comprise downstream signals, and wherein the output port is configured to relay the downstream signals to the subscriber device.

24. The device of claim 21, wherein the predetermined duration starts in response to the output port being coupled to the subscriber device.

25. The device of claim 21, wherein the two-way CATV signals comprise upstream signals and downstream signals, and wherein the input port is configured to relay the upstream signals to a CATV headend and the downstream signals from the CATV headend.

26. The device of claim 18, wherein the two-way CATV signals comprise downstream CATV signals.

27. The device of claim 18, wherein the two-way CATV signals comprise upstream CATV signals.

28. The device of claim 18, wherein the two-way CATV signals comprise downstream and upstream CATV signals.

29. The device of claim 18, wherein the portion of the two-way CATV signals comprises a downstream portion of CATV signals.

30. The device of claim 18, wherein the portion of the two-way CATV signals comprises an upstream portion of CATV signals.

* * * * *